United States Patent
Kim

(10) Patent No.: US 8,266,555 B2
(45) Date of Patent: Sep. 11, 2012

(54) METHOD FOR MANUFACTURING AN EXPOSURE MASK

(75) Inventor: Cheol kyun Kim, Icheon-si (KR)

(73) Assignee: Hynix Semiconductor Inc, Icheon-Si (KR)

( * ) Notice: Subject to any disclaimer, the term of this patent is extended or adjusted under 35 U.S.C. 154(b) by 450 days.

(21) Appl. No.: 12/494,248

(22) Filed: Jun. 29, 2009

(65) Prior Publication Data

US 2010/0162195 A1   Jun. 24, 2010

(30) Foreign Application Priority Data

Dec. 19, 2008   (KR) .................. 10-2008-0130113

(51) Int. Cl.
*G06F 17/50*   (2006.01)
(52) U.S. Cl. ............ 716/53; 716/51; 716/54; 716/55
(58) Field of Classification Search ............ 716/50–56
See application file for complete search history.

(56) References Cited

U.S. PATENT DOCUMENTS

| | | | | |
|---|---|---|---|---|
| 7,155,689 | B2 * | 12/2006 | Pierrat et al. ............... | 716/52 |
| 7,685,558 | B2 * | 3/2010 | Lai et al. ............... | 716/51 |
| 2004/0063000 | A1 * | 4/2004 | Maurer et al. ............... | 430/5 |
| 2005/0076316 | A1 * | 4/2005 | Pierrat et al. ............... | 716/4 |
| 2006/0236295 | A1 * | 10/2006 | Baba-Ali ............... | 716/19 |
| 2006/0273266 | A1 * | 12/2006 | Preil et al. ............... | 250/548 |
| 2006/0281016 | A1 * | 12/2006 | O'Brien ............... | 430/5 |
| 2007/0266362 | A1 * | 11/2007 | Lai et al. ............... | 716/19 |
| 2008/0143982 | A1 * | 6/2008 | Troost et al. ............... | 355/53 |
| 2010/0185998 | A1 * | 7/2010 | Wang ............... | 716/19 |
| 2010/0333049 | A1 * | 12/2010 | Agarwal et al. ............... | 716/55 |
| 2011/0016437 | A1 * | 1/2011 | Scherubl et al. ............... | 716/52 |

FOREIGN PATENT DOCUMENTS

| | | |
|---|---|---|
| JP | 2004-226965 | 8/2004 |
| KR | 1020050080819 A | 8/2005 |
| KR | 1020080021358 A | 3/2008 |
| KR | 100861376 B1 | 9/2008 |

* cited by examiner

*Primary Examiner* — Stacy Whitmore

(57) ABSTRACT

A weak point detecting method of the present invention designs a target layout, and compensates an optical proximity effect for the target layout, thereafter, verifies the target layout in which the optical proximity effect is compensated by using an NILS of the target layout, thereby, enabling to reduce the time and cost in detecting a weak point for a full chip regardless of the size and form of a pattern.

11 Claims, 3 Drawing Sheets

METHOD FOR MANUFACTURING AN EXPOSURE MASK

CROSS-REFERENCE TO RELATED APPLICATION

The priority of Korean patent application No. 10-2008-0130113 filed on Dec. 19, 2008, the disclosure of which is hereby incorporated in its entirety by reference, is claimed.

BACKGROUND OF THE INVENTION

The present invention relates to a method of detecting a weak point in an exposure mask, and more particularly, to a method of detecting a weak point using a NILS (Normalized Image Log Slope).

Generally, an exposure mask (reticle) is required in addition to an exposure apparatus and a photoresist to form a pattern used for a photolithography process to produce a semiconductor. The exposure mask is an original plate which is used to repetitively form a pattern on a semiconductor substrate. It is made of a formed quartz plate of a chrome pattern having four or five times the size of the target pattern according to the reduction projection rate. The pattern on this exposure mask should have the same critical dimension for the same layout pattern. That is, the accuracy of a pattern becomes an important factor in the fabrication of the exposure mask. Recently, the demand on accuracy has increased more and more as the line width of the semiconductor device has decreased.

As the pattern gradually becomes minute due to a high integration of the semiconductor device, the patterns which are projected onto the semiconductor substrate through an exposure process can become distorted from the real image of an exposure mask pattern. Particularly, if a gap between adjacent patterns is short among exposure mask patterns, adjacent patterns affects each other and the pattern is distorted. This phenomenon is called as an optical proximity effect.

This optical proximity effect causes a weak point by not satisfying a specific specification that the critical dimension of layout has. At this time, the weak point is estimated by comparing a contour image obtained through a simulation with the specific specification that the critical dimension of has layout has.

In detail, the weak point means a point where the critical dimension of a layout and the critical dimension of a contour image do not coincide according to various process parameters. At this time, the region in which weak points are easily caused includes patterns in which the gap between nearby patterns is narrow, or patterns in which the width is narrow.

FIG. 1a is a contour image showing a weak point according to a related art, FIG. 1b is a light intensity profile showing a weak point according to the related art.

As shown in FIG. 1a, a part in which the critical dimension of the contour image does not satisfy a specific specification is determined by comparing the critical dimension of the layout with the critical dimension of the contour image. That is, like 'A' of FIG. 1a, it is the region in which the critical dimension of the gap between adjacent patterns is smaller than the critical dimension of the actual layout and such region is determined as a weak point.

As shown in FIG. 1b, the weak point is located by using the maximum value and minimum value of the light source intensity which penetrated the exposure mask. That is, like 'B' of FIG. 1b, as the intensity of the light source does not exceed a reference point (i.e., the horizontal line) and becomes lower than the reference point, it can become a bridged region with adjacent patterns, so that such a region is determined as a weak point.

However, there is a problem in that the method for detecting the above-described weak point may determine a weak point that is not an actual weak point. That is because that all the region has a intensity which is similar to the intensity changed by the process parameter which cannot be predicted according to the process variation of a mask is extracted as a weak point.

Accordingly, there is a problem in that a region which is not a weak point is modified such that another distortion of a wafer image is created.

BRIEF SUMMARY OF THE INVENTION

Various embodiments of the invention are directed to providing a method for manufacturing a semiconductor device.

The present invention relates to a weak point detecting method, more particularly, to a weak point detecting method using NILS (Normalized Image Log Slope).

According to an embodiment of the present invention, a method for detecting a weak point comprises: providing a target layout; compensating for an optical proximity effect on the target layout; and determining whether or not the optical proximity effect compensation of the target layout is satisfactory by using a Normalized Image Log Slope (NILS) of the target layout.

Preferably, after determining the target layout, a method for making an exposure mask using the target layer if the optical proximity effect compensation is deemed to be satisfactory.

Preferably, the determining step comprises: providing a NILS specification; and comparing the NILS specification with a NILS of the target layout.

Preferably, providing the NILS specification comprises calculating a NILS of a weak point extracted through an intensity profile of an original pattern.

Preferably, the intensity profile of an original pattern is an intensity profile obtained through a wafer image of a layout in which patterns having a similar form and size with patterns formed in the target layout are formed.

Preferably, comparing the NILS specification with the NILS of the target layout is classified into a case in which the NILS of the target layout is smaller than the NILS specification or a case in which the NILS of the target layout is greater than the NILS specification.

Preferably, the method for detecting a weak point further comprises redesigning the target layout, after comparing the NILS specification with the NILS of the target layout if the NILS of the target layout is smaller than the NILS specification.

Preferably, after redesigning the target layout, a method for detecting a weak point further comprises: compensating an optical proximity effect on the redesigned target layout; and determining whether or not the redesigned target layout in which the optical proximity effect is compensated by using a NILS of the redesigned target layout is satisfactory.

Preferably, a method for detecting a weak point further comprises making an exposure mask using if the NILS of the target layout is greater than the NILS specification.

Preferably, the NILS is a value optained by multiplying an ILS by a critical dimension of the pattern, where NILS is optained by:

$$NILS = ILS * x = dI/dx * 1/x * x = dI/dx,$$

where I indicates the intensity of illumination source, and x indicates a critical dimension of a pattern; and wherein the ILS indicates a variation of log value of an intensity for a change of a critical dimension of a pattern, where ILS is obtained by:

$$ILS = d(\ln I)/dx = 1/x * dI/dx,$$

where I indicates the intensity of illumination source, and x indicates a critical dimension of a pattern.

DESCRIPTION OF EMBODIMENTS

Hereinafter, an embodiment of the present invention will be illustrated with reference to the attached drawings.

Figure 1A:
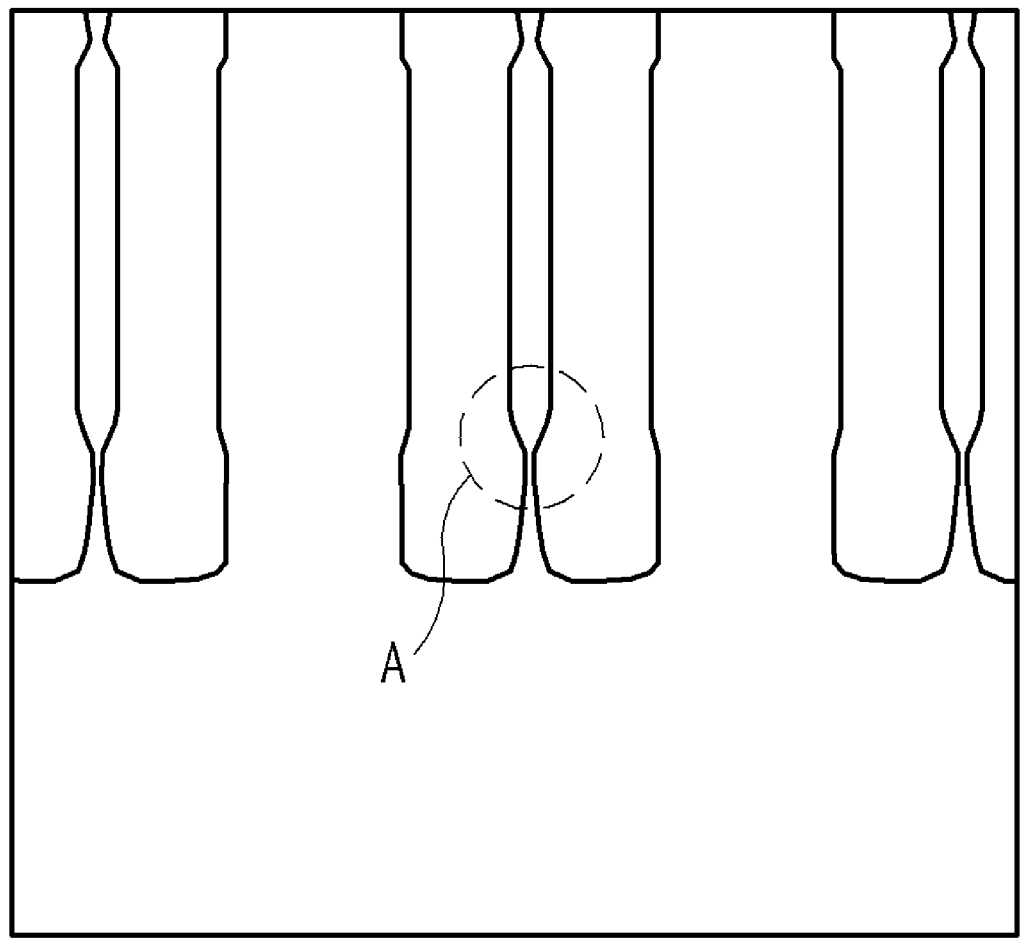
FIG. 1a is a plan view of a semiconductor device and FIG. 1b is a light intensity graph for a mask, both of which illustrate a method for extracting a mask error enhancing factor through a contour image according to the related art.
Figure 1B:
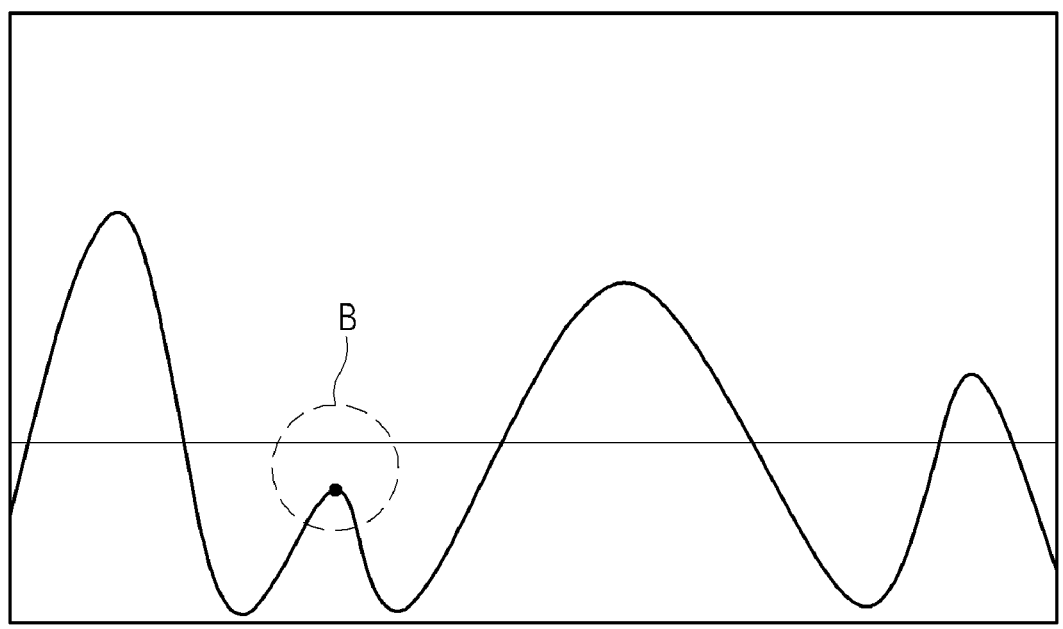
Figure 2:
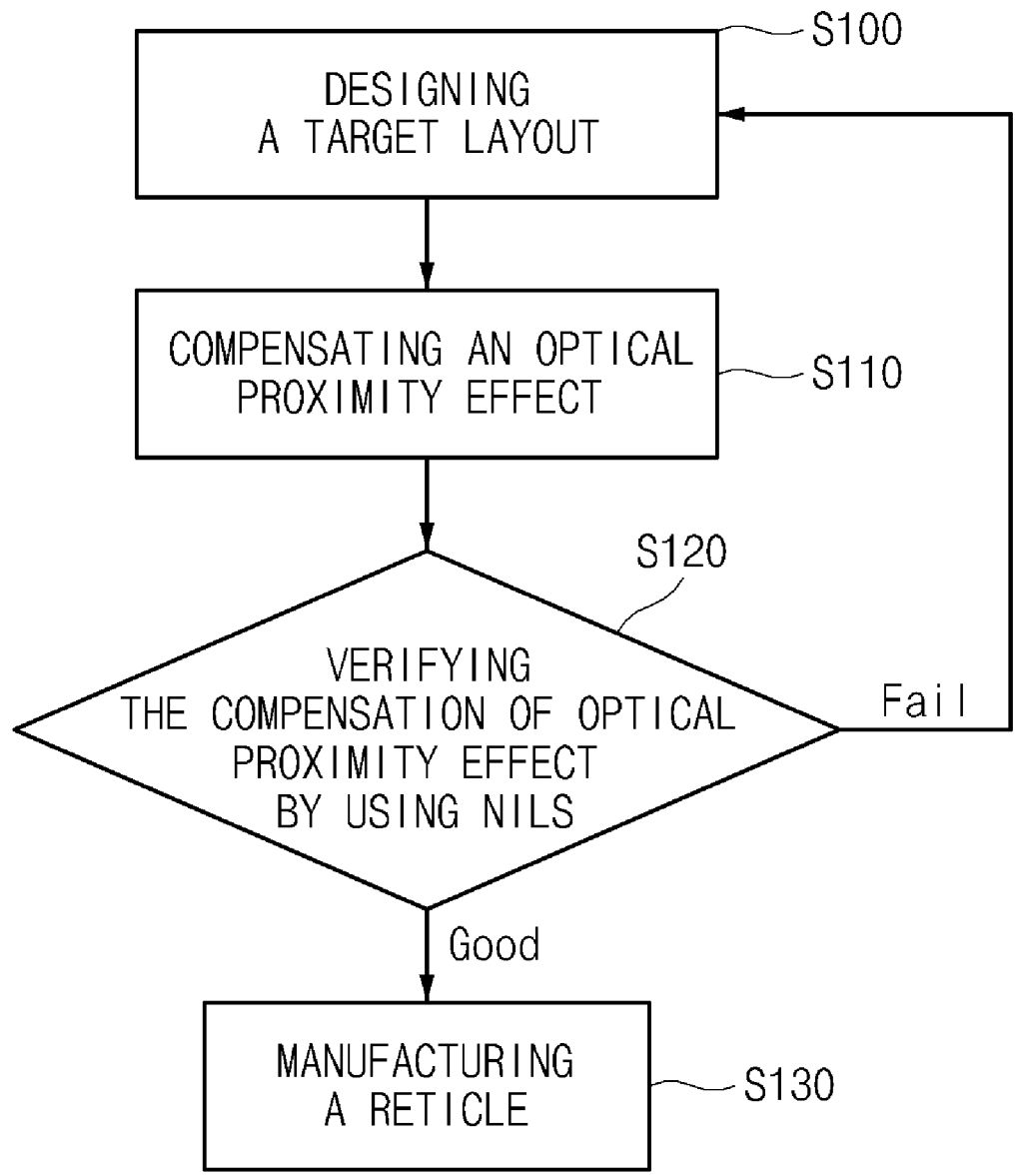
FIG. 2 is a flowchart which makes a final exposure mask by a method for detecting a mask error enhancing factor of the present invention.

FIG. 2 is a flowchart which makes a final exposure mask by using a method for detecting a mask error enhancing factor of the present invention.

A target layout is designed (S100). Here, the target layout can be a layout including a new design capable of improving a design for the characteristic enhancement of a semiconductor device or a process margin.

Then, an optical proximity effect compensation for the target layout, e.g., an optical proximity correction, is performed (S110). This predicts the image of a final pattern by simulation modeling, and then performing a calibration through the pattern implemented as a distorted form.

The calibration can be understood as a process of minimizing the difference between the target layout and the distorted pattern by using a method of adding or removing patterns which are lower than an exposure mask resolution. For example, the line-end treatment or the insertion of scattering bars is used.

The line-end treatment is a method of adding a corner serif pattern or a hammer pattern to overcome the problem that an end of a line pattern is rounded. The insertion of scattering bars is a method of adding sub-resolution scattering bars around a target pattern in order to minimize the line width variation of a pattern according to a pattern density.

Then, it is verified whether the optical proximity effect compensation which was performed in a previous step was accurately made by using the Normalized Image Log Slope (NILS) (S120).

This can be understood as a program which determines whether the NILS of the optical proximity effect compensated layout performed at step S110 satisfies with the specification of NILS. For a more detailed description, it will be described based on the method of determining a NILS specification and the method of obtaining the NILS of the optical proximity effect compensated layout.

The NILS is a value generalized by multiplying an ILS (image log slope) value by a critical dimension factor of pattern. Here, the ILS indicates the variation of log value of the intensity for the change of the critical dimension of pattern, and it is shown in Equation 1.

$$ILS = d(\ln I)/dx = 1/x * dI/dx \quad \text{[Equation 1]}$$

where, I indicates the intensity of illumination source, and x indicates a critical dimension of pattern.

The change of the intensity log slope of aerial image according to the pattern critical dimension, that is, the dose change of exposure energy for the critical dimension of pattern can be known through the ILS. Accordingly, the ILS has a positive value, and the image contrast is improved as the ILS value becomes greater.

The NILS is a value obtained by multiplying an ILS by a critical dimension of the pattern, and is shown below in Equation 2.

$$NILS = ILS * x = dI/dx * 1/x * x = dI/dx \quad \text{[Equation 2]}$$

The NILS indicates a value to which the size of a pattern is not reflected by multiplying a value of ILS by a critical dimension which is a factor relating to pattern and removing the pattern factor. That is, it is a value obtained by normalizing the intensity from which the dependability of the critical dimension of the pattern is removed. Accordingly, the NILS also has a positive value, and the image contrast is improved as the value becomes greater.

The specification of NILS means the NILS of the weak point extracted through the intensity profile of an original pattern with reference to the above-described Equation 2. This can be the minimum value of the NILS value calculated with reference to Equation 2. At this time, the original pattern can be a wafer image of the layout in which the patterns have similar size and form to the patterns formed in the target layout.

The NILS is a value from which the dependability on the critical dimension of a pattern is removed. Therefore, the error that the peri region is extracted as a weak point can be improved. That is, the present invention does not extract the peri region as a weak point only for the reason that the intensity of the peri region is smaller than that of the cell region. At this time, the weak point can be considered as a region where the intensity is less than the intensity of the general cell region and a pattern is formed with a bigger critical dimension on the actual wafer to cause a defect.

However, since the critical dimension of the peri region pattern is greater than the critical dimension of the cell region pattern, even if it has a light intensity that is less than the intensity of the cell region, there is no problem in exposing. Accordingly, the peri region may erroneously be calculated as a weak point. Therefore, the above described error can be improved by extracting the weak point by using the NILS which is not by using an absolute value of the intensity depending on the critical dimension of the pattern.

In other words, the error where the peri region is included in the weak point of the cell region depending on the absolute value of the light intensity according to the critical dimension of a pattern can be improved. This solves the problem where the NILS of the peri region is not differentiated from the NILS of the cell region weak point such that the peri region is falsely determined as a weak point.

The NILS of the target layout in which the optical proximity effect is compensated means the NILS extracted through the simulation result for the target layout. Therefore, the NILS of the weak point is accurately determined based on the NILS specification, so that the compensation of the optical proximity effect is verified.

If the NILS extracted from the target layout is smaller than the NILS specification, there still exists a weak point, so that re-design of the target layout would be needed. Thus, it returns to a step of designing the target layout (S100).

The target layout of the weak point is modified so that the NILS extracted from the target layout may have a greater value as compared with the NILS specification. After performing the compensation of the optical proximity effect for the modified layout, the optical proximity effect compensation is re-verified based on the NILS specification. Until the NILS extracted from the target layout has a greater value as compared with the NILS spec, a series of processes are repeatedly executed.

In a case where the NILS extracted from the target layout is greater than the NILS spec, it means that the weak point no longer exists in the layout in which the optical proximity effect is compensated and it proceeds to the next step as the re-design of the target layout is unnecessary.

Then, an exposure mask (reticle) for the layout which satisfies the NILS specification is manufactured (S130).

As described above, the image of a pattern formed on an actual wafer is analogized through the simulation of a target layout in which the optical proximity effect compensation for the target layout is completed prior to the manufacturing of the exposure mask. Thereafter, the simulation image is compared with the target layout to find a distorted region and extract it as a weak point. At this time, the weak point is extracted by using the NILS which is not affected by the critical dimension of a pattern, so that the full chip region of the semiconductor device is extracted without an error, thereby, being able to reduce the time and cost.

The above embodiments of the present invention are illustrative and not limitative. Various alternatives and equivalents are possible. The invention is not limited by the type of deposition, etching polishing, and patterning steps describe herein. Nor is the invention limited to any specific type of semiconductor device. For example, the present invention may be implemented in a dynamic random access memory (DRAM) device or non volatile memory device. Other additions, subtractions, or modifications are obvious in view of the present disclosure and are intended to fall within the scope of the appended claims.

What is claimed is:

1. A method for manufacturing an exposure mask, the method comprising:
   providing a target layout;
   compensating for an optical proximity effect on the target layout;
   verifying the optical proximity effect compensation by comparing a normalized image log slope (NILS) specification with an NILS of the target layout on which the optical proximity effect is compensated; and
   making the exposure mask using the target layout after determining that the NILS of the target layout is greater than the NILS specification.

2. The method according to claim 1, wherein the NILS specification is obtained by calculating an NILS of a weak point extracted through an intensity profile of an original pattern.

3. The method according to claim 2, wherein the intensity profile of the original pattern is obtained through a wafer image of a layout in which patterns have a similar form and size with patterns formed in the target layout.

4. The method according to claim 1, further comprising:
   redesigning the target layout if the NILS of the target layout is smaller than the NILS specification as a result of the optical proximity effect compensation.

5. The method according to claim 4, further comprising:
   compensating for an optical proximity effect on the redesigned target layout; and
   verifying whether or not the redesigned target layout on which the optical proximity effect is compensated is satisfactory by using an NILS of the redesigned target layout.

6. The method of claim 1, wherein the NILS is a value obtained by multiplying an ILS by a critical dimension of a pattern, where the NILS is obtained by:

$$NILS=ILS*x=dI/dx*1/x*x=dI/dx,$$

where I indicates an intensity of an illumination source, and x indicates the critical dimension of the pattern, and wherein the ILS indicates a variation of a log value of an intensity for a change of the critical dimension of the pattern, where the ILS is obtained by:

$$ILS=d(\ln I)/dx=1/x*dI/dx.$$

7. A method for manufacturing an exposure mask, the method comprising:
   providing a target layout;
   compensating for an optical proximity effect on the target layout;
   verifying the optical proximity effect compensation by comparing a normalized image log slope (NILS) specification with an NILS of the target layout on which the optical proximity effect is compensated; and
   making the exposure mask using the target layout after determining that the NILS of the target layout is greater than the NILS specification,
   wherein the NILS is a value obtained by multiplying an ILS by a critical dimension of a pattern, where the NILS is obtained by:

$$NILS=ILS*x=dI/dx*1/x*x=dI/dx,$$

where I indicates an intensity of an illumination source, and x indicates the critical dimension of the pattern, and wherein the ILS indicates a variation of a log value of an intensity for a change of the critical dimension of the pattern, where the ILS is obtained by:

$$ILS=d(\ln I)/dx=1/x*dI/dx.$$

8. The method according to claim 7, wherein the NILS specification is obtained by calculating an NILS of a weak point extracted through an intensity profile of an original pattern.

9. The method according to claim 8, wherein the intensity profile of the original pattern is obtained through a wafer image of a layout in which patterns have a similar form and size with patterns formed in the target layout.

10. The method according to claim 7, further comprising:
    redesigning the target layout if the NILS of the target layout is smaller than the NILS specification as a result of the optical proximity effect compensation.

11. The method according to claim 10, further comprising:
    compensating for an optical proximity effect on the redesigned target layout; and
    verifying whether or not the redesigned target layout on which the optical proximity effect is compensated is satisfactory by using an NILS of the redesigned target layout.

* * * * *